(12) United States Patent
Bruce et al.

(10) Patent No.: US 7,300,116 B2
(45) Date of Patent: Nov. 27, 2007

(54) CENTER LOCK WHEEL COVER

(75) Inventors: Jeff Bruce, Fowlerville, MI (US); Kent Wellhoff, Almont, MI (US)

(73) Assignee: McKechnie Vehicle Components (USA), Inc., Troy, MI (US)

( * ) Notice: Subject to any disclaimer, the term of this patent is extended or adjusted under 35 U.S.C. 154(b) by 68 days.

(21) Appl. No.: 11/012,641

(22) Filed: Dec. 15, 2004

(65) Prior Publication Data

US 2006/0125311 A1    Jun. 15, 2006

(51) Int. Cl.
    *B60B 7/08*    (2006.01)
(52) U.S. Cl. .............................. 301/37.31; 301/37.26; 301/37.11; 301/37.106
(58) Field of Classification Search ........... 301/37.101, 301/37.24, 37.26, 37.27, 37.11, 37.43, 37.106, 301/37.31, 37.36
    See application file for complete search history.

(56) References Cited

U.S. PATENT DOCUMENTS

| | | | |
|---|---|---|---|
| 4,530,542 A * | 7/1985 | Spiegel et al. ......... | 301/37.376 |
| 5,346,288 A | 9/1994 | Hodge et al. | |
| 5,368,370 A * | 11/1994 | Beam ..................... | 301/37.36 |
| 5,443,582 A | 8/1995 | Ching | |
| 5,577,809 A | 11/1996 | Chase | |
| 5,595,423 A * | 1/1997 | Heck et al. ............... | 301/37.43 |
| 5,636,906 A * | 6/1997 | Chase ..................... | 301/37.43 |
| 5,664,845 A | 9/1997 | Maloney et al. | |
| 6,152,538 A | 11/2000 | Ferriss et al. | |
| 6,238,007 B1 | 5/2001 | Wieczorek et al. | |
| 6,270,167 B1 * | 8/2001 | Kemmerer et al. ...... | 301/37.43 |
| 6,443,531 B1 | 9/2002 | Hogan et al. | |
| 6,637,832 B2 * | 10/2003 | Wrase et al. ............. | 301/37.31 |
| 2002/0050735 A1 * | 5/2002 | Tanghetti ................ | 301/37.43 |
| 2002/0093242 A1 | 7/2002 | Chase et al. | |
| 2002/0153763 A1 * | 10/2002 | Van Houten et al. ... | 301/37.43 |
| 2003/0067212 A1 | 4/2003 | Wrase et al. | |
| 2005/0073191 A1 * | 4/2005 | Gerard ................... | 301/37.101 |

* cited by examiner

*Primary Examiner*—Russell D. Stormer
(74) *Attorney, Agent, or Firm*—Butzel Long

(57) ABSTRACT

A center lock for a wheel cover of a wheel assembly that includes a wheel cover and a wheel. The wheel includes a recessed hub area that is surrounded by an annular wall having a protrusion formed therein. The wheel cover is configured to engage the protrusion and thereby lock the center of the wheel cover onto the wheel. The wheel assembly may also include a rim lock by providing a recess in the outer periphery of the wheel and a lip in the outer periphery of the wheel cover that is configured to engage the recess in the outer periphery of the wheel. The wheel assembly can include a central cap that includes clasp elements which engage the protrusion formed in the annular wall of the wheel.

25 Claims, 6 Drawing Sheets

CENTER LOCK WHEEL COVER

TECHNICAL FIELD

The present invention relates to wheel covers and wheel assemblies for vehicles. More particularly, the present invention relates to wheel covers that are provided with mechanical locking arrangements for securing the wheel covers to underlying wheels.

BACKGROUND ART

Wheel assemblies that utilize wheel appliques to decorate the external or outboard surfaces of plain steel wheels are well known and are far less expensive to produce than one-piece decorative wheels that have to be formed and finished.

Wheel appliqués can be secured to wheels by various mechanical engaging structures and/or by adhesives. U.S. Pat. No. 5,664,845 to Maloney et al. discloses a vehicle wheel cover retention system in which the annular lip of the wheel cover is configured to spring outwardly into a groove provided in the inner surface of the wheel. U.S. Pat. No. 5,595,423 to Heck et al. discloses a vehicle wheel cover retention system in which the outer end of the wheel cover is deformed to cover the outer peripheral end of the outboard bead seat retaining flange of the wheel. Both U.S. Pat. No. 5,664,845 to Maloney et al. and U.S. Pat. No. 5,595,423 to Heck et al. utilize an adhesive in cooperation with their respective mechanical engaging structures.

U.S. Pat. Nos. 5,577,809 and 5,636,906 to Chase disclose wheel assemblies having wheel covers which are secured to wheels by means of a plurality of fasteners. The wheel covers include bosses which protrude from the inboard side of the wheel covers. The bosses are engaged in recesses formed in outboard surface of the wheel and the fasteners are inserted into the bosses to secure the wheel covers to the wheels.

U.S. Pat. No. 5,346,288 to Hodge et al. is somewhat similar in concept to the Chase patents above in that Hodge et al. teaches a wheel assembly in which the wheel cover is attached directly to the wheel by threaded members that are received in mounting apertures formed in the central hub portion of the wheel.

U.S. Pat. No. 5,443,582 to Ching teaches a wheel assembly in which a wheel cover is attached to a wheel by means of an intermediate pair of brackets and fastener members.

U.S. Pat. No. 6,443,531 to Hogan et al. discloses a decorative wheel cover that is secured to a wheel by a plurality of protrusions that are received in corresponding depressions or slots in a wheel.

U.S. Patent Application Publication No. 2002/0153763 to Van Houten et al. teaches a wheel assembly that includes a cladding that is secured to a central portion of a wheel by a snap tab that includes a protuberance which is biased into an indent.

U.S. Pat. No. 6,152,538 to Ferriss et al. teaches a wheel assembly that includes a wheel cover that is secured to an outer peripheral edge of a wheel by a rim clasp and is secured to an inner portion of the wheel by a protrusion with or without a spring element to bias the protrusion into a channel formed in the wheel.

U.S. Patent Application Publication No. 2003/0067212 to Wrase et al. discloses a wheel assembly that includes a wheel cover that is attached to an underlying wheel by snap tabs which are received in a recess provided in a wall of an annular recess of the wheel.

European style wheel assemblies, also called flangeless wheels, typically have a design which does not incorporate an outboard balance weight flange. Accordingly, such wheel assembly styles do not allow for mechanical fastening of the wheel appliques or covers over the periphery of the wheel.

A wheel assembly designed with a secure mechanical means of attaching a wheel applique or cover at the central portion of the underlying wheel would be welcome in the art.

DISCLOSURE OF THE INVENTION

According to various features, characteristics and embodiments of the present invention which will become apparent as the description thereof proceeds, the present invention provides a wheel assembly which includes:

a wheel that includes an outboard surface, a recessed central hub area in the outboard surface and an annular wall surrounding the central hub area, the annular wall having a protrusion formed therein which extends inwardly, a curved portion which extends from the protrusion to a bottom of the central hub area, and an annular seat formed in a transition area at the top of the annular wall; and a wheel cover having a center portion which is complementarily formed to the central hub area of the wheel so as to overlap the protrusion formed in the annular wall of the wheel and lie against the annular seat, the wheel cover having an inner portion which lies in the curved portion of the annular wall.

The present invention also provides a wheel cover for covering a wheel having a hub receiving area, an annular wall surrounding the hub receiving area, a protrusion formed in the annular wall, and an outboard peripheral edge, the wheel cover including:

a wheel cover having an inner portion disposed adjacent the hub receiving area and an outer periphery disposed adjacent the outboard peripheral edge; and a hub lock for securing the wheel cover to the hub receiving area of the wheel, the hub lock including an area of the inner portion of the wheel cover which is complementarily shaped to be superposed over the protrusion formed in the annular wall of the wheel.

The present invention further provides a wheel assembly that includes:

wheel having a hub receiving area, and annular wall surrounding the hub receiving area, a protrusion formed in the annular wall, an annular seat formed in a transition area at the top of the annular wall, and an outboard peripheral edge;

a wheel cover having an inner portion disposed adjacent the hub receiving area and an outer periphery disposed adjacent the outboard peripheral edge;

a hub lock for securing the wheel cover to the hub receiving area of the wheel, the hub lock including an area of the inner portion of the wheel cover which is complementarily shaped to be superposed over the protrusion formed in the annular wall of the wheel; and a cap which is configured to extend over the central hub area of the wheel with the wheel cover therebetween.

BRIEF DESCRIPTION OF DRAWINGS

The present invention will be described with reference to the attached drawings which are given as non-limiting examples only, in which.

BEST MODE FOR CARRYING OUT THE INVENTION

The present invention is directed to wheel assemblies that include decorative wheel appliques or covers that are attached to underlying wheels. In particular, the present invention is directed to wheel assemblies in which the wheel covers are configured along an inner portion to include a structure that can cooperate with a profile provided in an inner portion of the wheel to mechanically secure the wheel covers to the wheels. The cooperating structures provide a permanent retention lock which secures the wheel covers against the wheels.

During the manufacturing of wheel assemblies using the wheel covers and wheels of the present invention, the mechanical locking structures, referred herein as a "center lock," are used in conjunction with an adhesive to secure the wheel covers against the wheels while the adhesive cures. The adhesive can be applied as a continuous layer or in a desired pattern between the wheel cover and wheel in a conventional manner.

Because the wheel cover assemblies of the present invention secure the wheel covers to the underlying wheels near the center of the wheel assemblies, the outer peripheral edges of the wheel covers can terminate within the outboard rim of the wheels if desired. According to another embodiment of the present invention the wheel covers can also be configured along an outer peripheral portion to include a peripheral locking structure that can cooperate with a recess provided in an outer peripheral portion of the wheel to mechanically secure the wheel covers to the wheels along the outer periphery of the wheel assemblies.

The center locking mechanism of the present invention includes a unique structural configuration according to which a portion of the wheel cover is biased by contact into a curved or recessed portion in the wheel which engages the wheel cover in locking relationship. This configuration eliminates the need for auxiliary elements such as springs and snap tabs that might otherwise be used to urge the wheel cover into locking engagement with the wheel.

The wheel covers of the present invention are preferable made from a metal such as stainless steel. However, it is within the scope of the present invention to make the wheel covers from plastic materials. The wheel covers, whether metal or plastic can be finished so that their outboard surfaces are plated or finished in any conventional manner.

Figure 1:
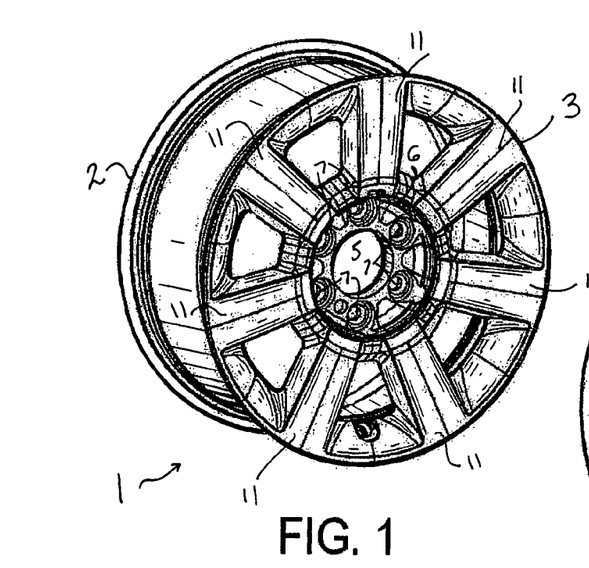
FIG. 1 is a perspective view of a wheel assembly according to one embodiment of the present invention.

FIG. 1 is a perspective view of a wheel assembly according to one embodiment of the present invention. The wheel assembly which is generally identified by reference numeral 1 includes a wheel 2 that can be made of aluminum, magnesium, steel, or other material conventionally used for manufacturing vehicle wheels. A decorative wheel cover 3 is attached to the otherwise outer exposed surface 4 (See FIG. 2) of wheel 2 using a mechanical locking arrangement according to the present invention. The wheel cover 3 is a thin metallic panel that can be made from stainless steel or other suitable metal or alloy. The outboard side of the wheel cover can be plated with a finish coat such as chromium or otherwise finished in some other manner such as painting, texturing, etc.

Wheel 2 is of the type which includes a central opening 5 in the wheel hub area 6 and a plurality of exposed lug nut apertures 7 arranged in a circular pattern and spaced for the particular vehicle on which wheel assembly 1 is to be employed. Wheel hub area 6 will typically be enclosed by a small cap once the wheel assembly 1 is mounted to a vehicle.

Figure 2:
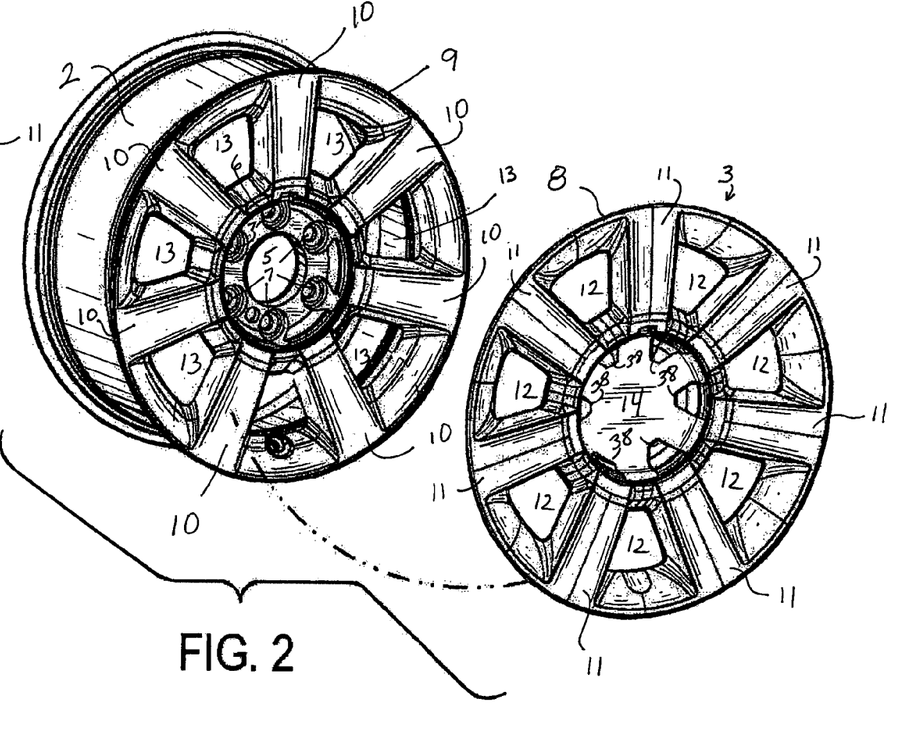
FIG. 2 is an exploded perspective view of the wheel assembly of FIG. 1.

Wheel cover 3 has a geometry and contour which substantially conform to that of wheel 2 namely, an outer peripheral edge 8 which fits over peripheral edge 9 of wheel 2. Spokes 11 extend radially outwardly from the center opening 14 and correspond in size, shape and location to the spokes 10 on wheel 2. Between the spokes 11 of wheel cover 3 are decorative openings or windows 12 that are shaped to conform to corresponding decorative openings or windows 13 in wheel 2. The central hub area surrounding central opening 14 of wheel cover 3 also includes a plurality of discrete protrusions 38 which, as discussed below, are used to mechanically secure the wheel cover 3 to the wheel 2. The central opening 14 of the wheel cover 3 is aligned with opening 5 in wheel hub 6, as best seen in FIG. 1. When the wheel cover 3 is attached to wheel 2, the wheel cover 3 appears as an integral outer surface of the wheel 1, as depicted in FIG. 1.

The wheel cover 3 is attached by the mechanical locking arrangements of the present invention and can further be bonded to wheel 2 by an adhesive that securely bonds the wheel cover 3 to the outboard face of the wheel 2. The adhesive can be applied in any desired pattern or as a continuous layer.

As an alternative to using metal wheel covers, the present invention can be used in conjunction with wheel covers that are made of solid panels of high-impact plastic materials. An advantage of using a high-impact plastic material such as a combination of polycarbonate and ABS having is that wheel covers 3 made from such materials can be injection molded. However, in certain applications and configurations, plastic wheel covers do not always feel and sound as solid as metal wheel covers.

Figure 3:
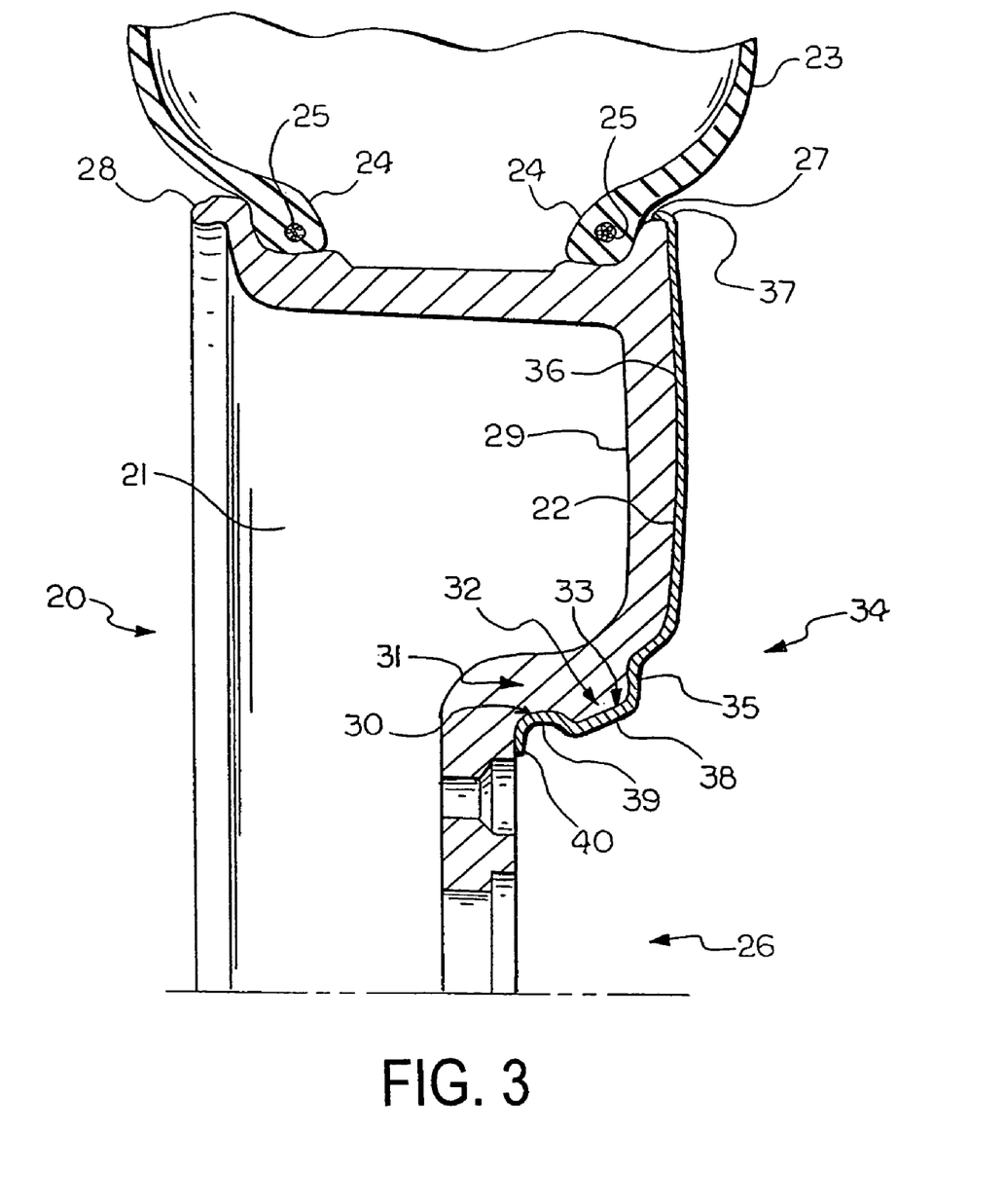
FIG. 3 is a cross-sectional side partial cut away view of a wheel assembly according to one embodiment of the present invention.

FIG. 3 is a cross-sectional side partial cut away view of a wheel assembly according to one embodiment of the present invention. FIG. 3 depicts a wheel assembly generally identified by reference numeral 20. The wheel assembly includes a vehicular wheel 21 and a wheel cover 22. Although the wheel 21 depicted in FIG. 3 is an alloy wheel, it is to be understood by those skilled in the art that a steel wheel may also be used for the vehicular wheel 21. A tire 23 is mounted on the vehicular wheel 21. The tire 23 has two tire beads 24, each of which includes a wire cable 25 extending therethrough.

The vehicular wheel 21 includes a central hub area 26 and an outer peripheral edge 27 and an inboard rim 28 which are configured to receive the tire beads 24 there between. The central hub area 26 is configured to mount the wheel assembly 20 a wheel hub (not shown) of a motor vehicle. A spider 29 extends between the outer peripheral edge 27 and the central hub area 26. The spider 29 may be of any shape or contour as is desired. Typically, the spider 29 includes brake vent openings or windows or decorative opening or windows there through. The central hub area 26 includes a curved portion or recess 30 that is formed at the base of an annular wall 31 that surrounds the central hub area 26 as shown. Above the curved portion or recess 30 is a protruding stepped portion 32 which has an inclined face 33. A transition area 34 which forms an annular seat 35 for a central cap as discussed below extends between the protruding stepped portion 32 and the outboard 36 face of spider 29.

The wheel cover 22 extends over the spider 29. The wheel cover 22 includes an inner portion which extends into the central hub area 26. The wheel cover 22 also includes an outer periphery 37 which extends over the outer peripheral edge 27 of the underlying wheel 21. The inner portion of wheel cover 22 includes spaced apart, inwardly directed protrusions 38 that are complementarily shaped to protruding stepped portion 32 of wheel 21. The protrusions 38 have outwardly directed curved portions 39 and terminal legs 40.

Inwardly directed protrusions 38 of wheel cover 22 are configured to be received in curved portion or recess 30 and are biased toward curved portion or recess 30 due to forces that that exist diametrically across the wheel assembly 20 where a similar protrusion 38 of the wheel cover 22 is pressed into curved portion or recess 30 on the opposite side of the wheel 21.

Inwardly directed protrusions 38 of wheel cover 22 are also biased against protruding stepped portion 32 by the manner in which terminal legs 40 of protrusions 38 are pressed against the bottom of central hub area 26 as shown.

Figure 4:
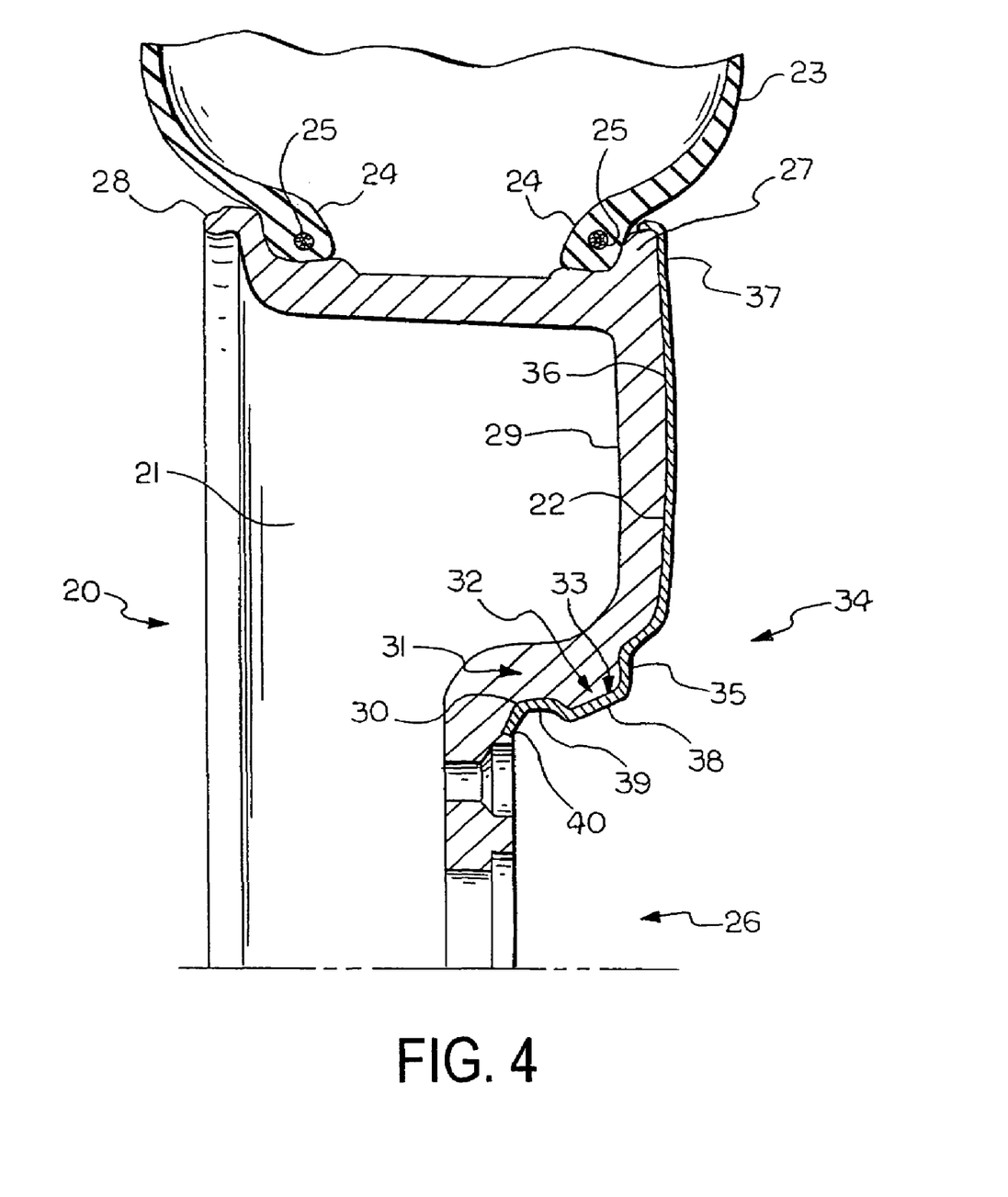
FIG. 4 is a cross-sectional side partial cut away view of a wheel assembly of FIG. 3 which depicts the manner in which the terminal leg of the wheel cover would extend absent contact with the central hub area.
Figure 5:
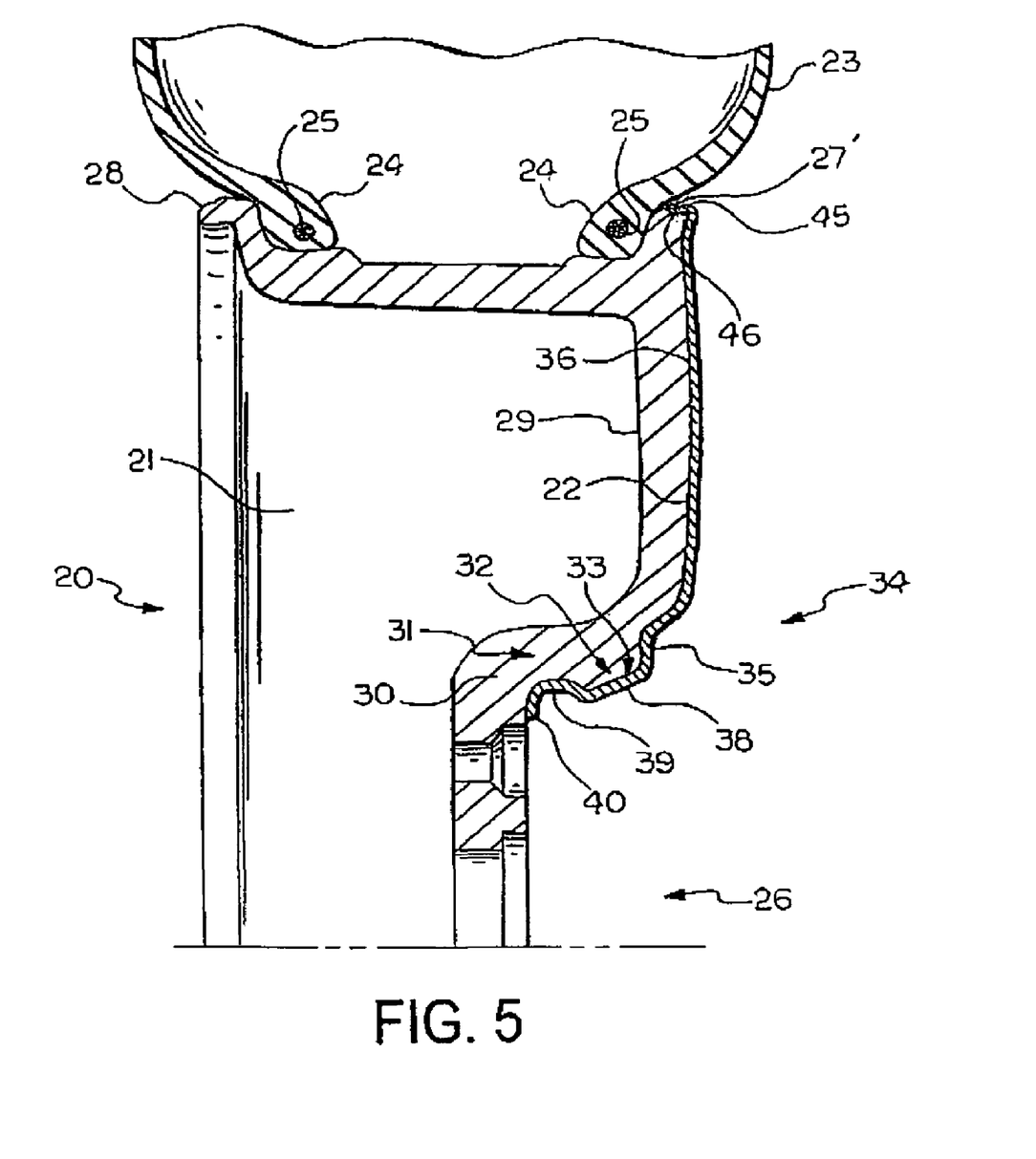
FIG. 5 is a cross-sectional side partial cut away view of a wheel assembly according to another embodiment of the present invention.

It is noted that FIGS. 3-5 are not drawn to scale and the invention is not limited to the dimensions in these drawings.

FIG. 4 is a cross-sectional side partial cut away view of a wheel assembly of FIG. 3 which depicts the manner in which a terminal leg 40 of a protrusion 38 would extend if it did not contact against the bottom of central hub area 26. The degree to which terminal leg 40 is deflected from the position shown in FIG. 4 to the position shown in FIG. 3 is proportional to the amount of biasing force that inwardly directed protrusion 38 of wheel cover 22 is biased against protruding stepped portion 32 of wheel 21. The biasing of inwardly directed protrusions 38 of wheel cover 22 into curved portion or recess 30 and against protruding stepped portion 32 provides a mechanical lock by which wheel cover 22 is secured to the vehicular wheel 21 at the inner portion thereof. The inwardly directed protrusions 38 function as a hub lock which secures the wheel cover 22 to the central hub area 26 of the vehicular wheel 21. Although not shown, the central hub area 26 of the wheel assembly 20 may be covered with a conventional hub cover or cap.

It is noted that rather than extending than providing discrete, spaced apart protrusions 38 it is also possible to provide a single protrusion that extends continuously around the wheel cover 22. It is also possible, when using discrete, spaced apart protrusions, to provide the curved portion or recess 30 and corresponding stepped portion 32 as discrete spaced apart features that are aligned to receive discrete, spaced apart protrusions. According to one embodiment the discrete, spaced apart arcuate protrusion segments, outwardly curved or recessed portions 39 and terminal leg portions 40 comprise 4 to 8 or more clasp elements having the inwardly directed protrusions 38 formed therein. The inwardly directed protrusions 38 formed on such clasp elements are received into curved portion or recess 30 of wheel 21 as shown in FIG. 3. As noted that the curved portion or recess 30 formed in the hub area 26 of the wheel 21 could be continuous or be provided in discrete segments to individually receive the clasp elements.

FIG. 5 is a cross-sectional side partial cut away view of a wheel assembly according to another embodiment of the present invention. The wheel assembly 20 depicted in FIG. 5 has a central locking structure similar to that shown in FIG. 3. In addition, the wheel assembly 20 depicted in FIG. 5 includes a peripheral locking structure that mechanically secures wheel cover 22 to the outer peripheral edge 27 of the vehicular wheel 21. The peripheral locking structure includes a lip 45 that is formed at the outer peripheral edge of the wheel cover 22. Lip 45 is configured to overlap and engage a complementary shaped recess 46 formed in the outer peripheral edge 27 of the underlying wheel 21. The shape of lip 45 can vary from that shown in FIG. 5 as long as the lip 45 is configured to matingly engage with a complementary recess 46 formed in the wheel 21.

Figure 6:
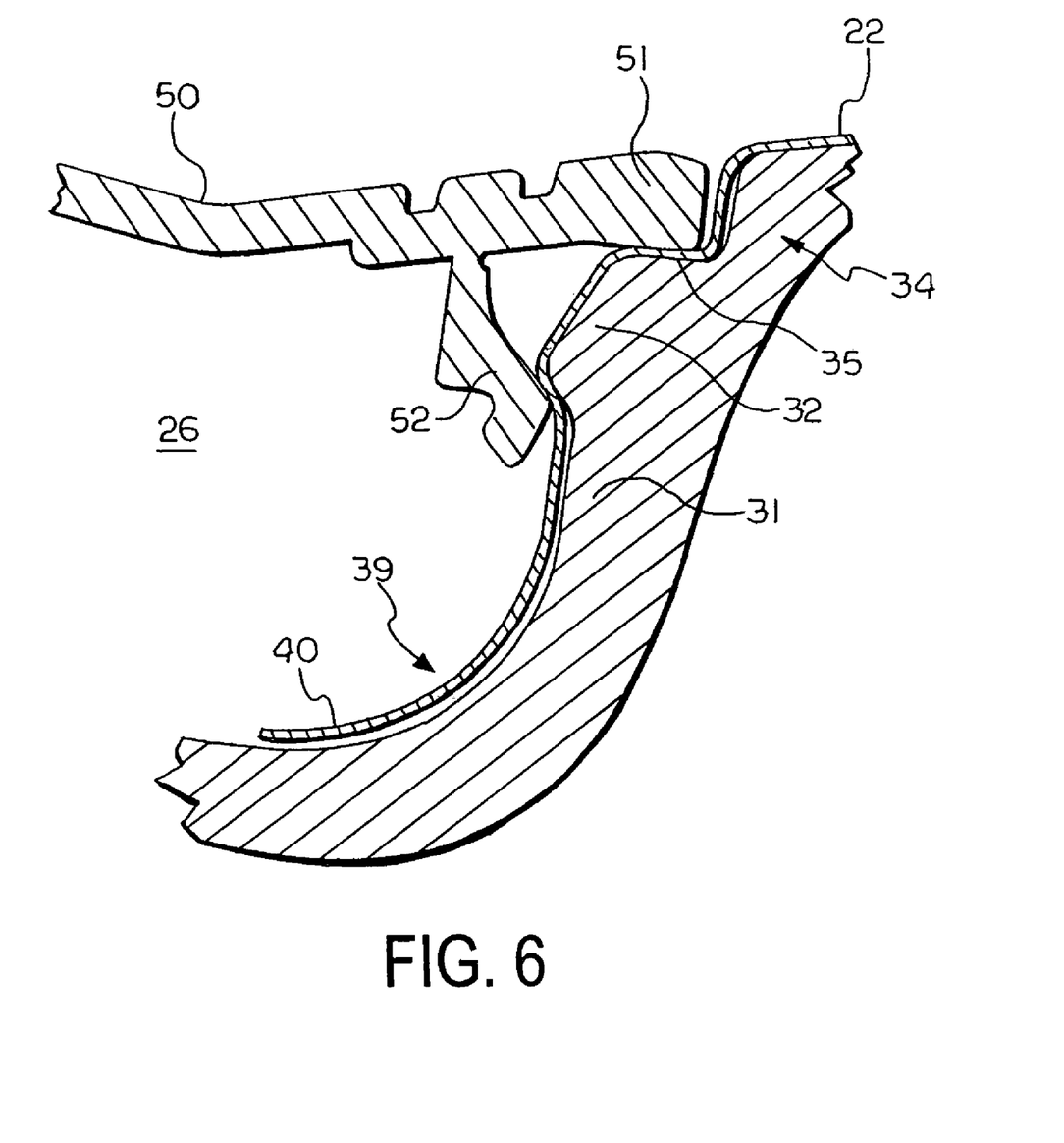
FIG. 6 is a cross-sectional side partial cut away view of a wheel assembly according to another embodiment of the present invention which depicts how a central cap can be secured to a wheel assembly.

FIG. 6 is a cross-sectional side partial cut away view of a wheel assembly according to another embodiment of the present invention which depicts how a central cover can be secured to a wheel assembly. In FIG. 6 the central hub area 26 of the wheel cover 22 is more recessed than as depicted in FIGS. 3-5 so that the terminal leg 40 of the wheel cover 22 is longer than that depicted in FIGS. 3-5, bearing in mind that, as noted above, FIGS. 3-5 are not drawn to scale. It is to be understood that the depth to which the central hub area 26 is recessed can be varied to accommodate any particular wheel design. So that, when the central hub area 26 is shallow, the curved portion or recess 30 is more pronounced as shown in FIGS. 3-5 and when the central hub area 26 is more deeply recessed, more of a gradual curve is formed at the base of the annular wall 31 than a defined recess.

The central cap 50 depicted in FIG. 6 includes an outer peripheral end 51 that is conformed to be received in the annular seat 35 formed in the transition area 34 above the protruding stepped portion 32. As shown in FIG. 6, the annular seat 35 formed in the transition area 34 above the protruding stepped portion 32 is conformed to receive the outer peripheral end 51 of central cap 50 which is tapered outward and downward to be received in the annular seat 35 as exemplified in FIG. 6.

The central cap 50 is provided around with a plurality of biased clasp elements 52 which are spaced apart and configured and positioned to engage the bottom portion of the protruding stepped portion 32 as shown in FIG. 6. The clasp elements 52 engage the protruding stepped portion 32 and thereby secure the outer peripheral end 51 of the central cap 50 in the annular seat 35 formed in the transition area 34. In addition to securing the central cap 50 to the wheel assembly 20, the central cap 50 together with the clasp elements 52 helps mechanically secure the wheel cover 22 over protruding stepped portion 34, thus adding to the integrity of the overall wheel assembly 20.

It is to be understood that the configuration of the central cap 50, annular seat 35 formed in the transition area 34 and protruding stepped portion 32 shown in FIG. 6 are exemplary and the shape of the annular seat 35 as well as the shape of the peripheral edge 51 of the central cap 50, the shape of the protruding stepped portion 32 and clasp elements 52 can be varied within the scope of the present invention to include any seat configuration that can receive an edge of a cap and any protrusion and clasp shape combination that can be engaged to hold the peripheral edge 51 of the cap 50 in the annular seat 35. The central cap 50 can be made from a plastic material or a metal or a combination of plastic materials and metals.

Figure 7:
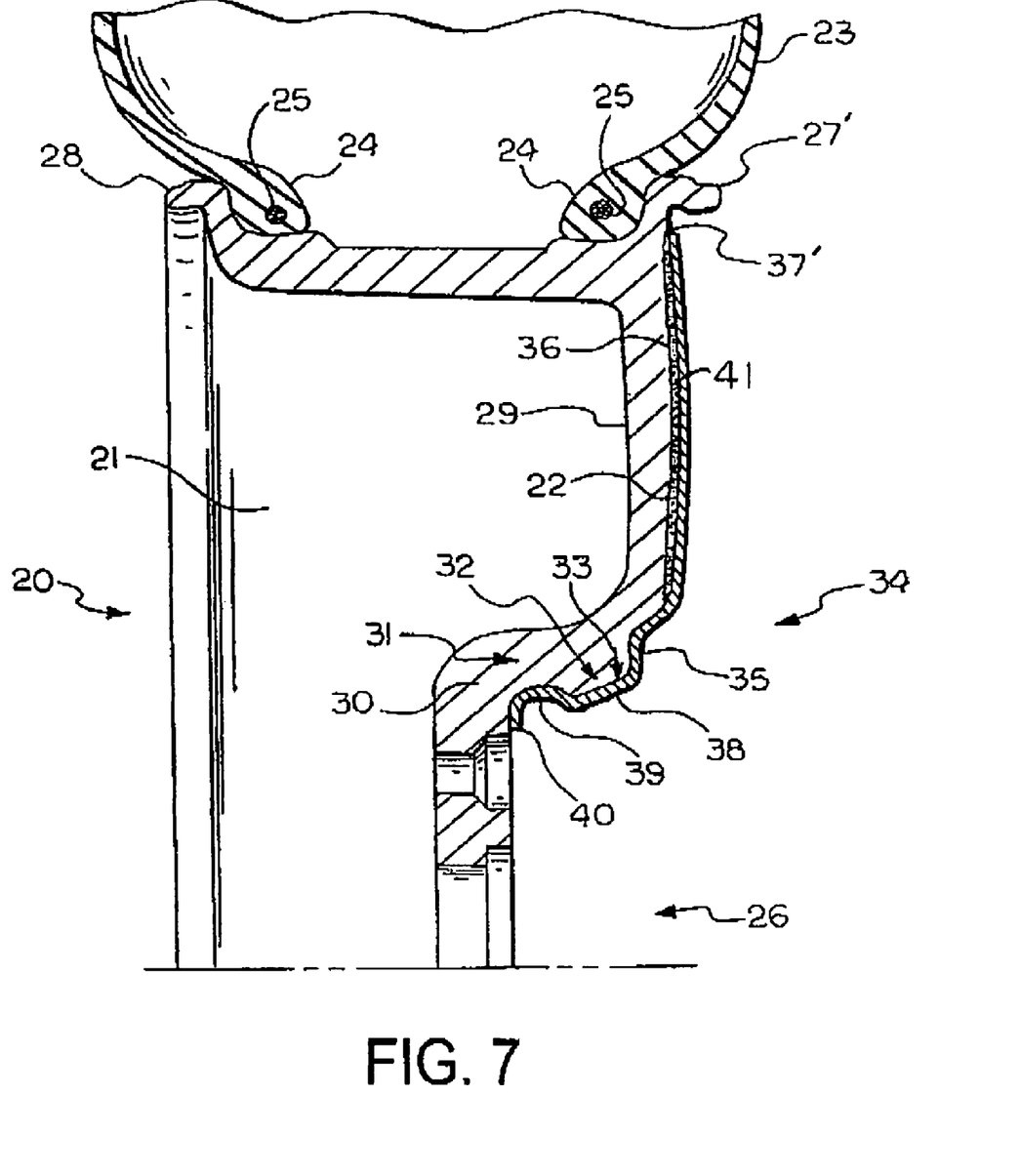
FIG. 7 is a cross-sectional side partial cut away view of a wheel assembly according to another embodiment of the present invention.

FIG. 7 is a cross-sectional side partial cut away view of a wheel assembly according to another embodiment of the present invention. The wheel assembly depicted in FIG. 7 is substantially the same as the wheel assembly depicted in FIG. 3 (in which similar reference numbers have been used). In the embodiment of the wheel assembly depicted in FIG. 7, the wheel 21 includes both outboard and inboard rims 27' and 28 which are configured to receive the tire beads 24 there between. This configuration allows conventional wheel balancing weights (not shown) to he attached to outboard rim 27' is desired. FIG. 7 also illustrates an adhesive 41 that can be provided between the outboard surface of the wheel 21 and an inboard surface of the wheel cover 22.

The wheel cover 22 in FIG. 7 includes an outer peripheral edge that terminates adjacent and radially inward from outboard rim 27'.

In addition to the mechanical fastening or locking systems of the present invention including the central locking structures and peripheral locking structures, an adhesive can be used to secure the wheel covers to the wheel assemblies. Alternatively, a sealant can be placed between the wheel covers and the wheels to limit ingress the collecting of contaminates between the wheel covers and wheels which contaminates might otherwise result in the corrosion of the outboard surface of the wheels and inboard surface of the wheel covers. Such adhesives or sealants can be applied in any conventional pattern between the wheel covers and wheels or as a continuous layer.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. A wheel assembly which comprises:
   a wheel that includes an outboard surface, a recessed central hub area in the outboard surface and an annular wall surrounding the central hub area, the annular wall having a protrusion formed therein which extends inwardly, a curved portion which extends from the protrusion to a bottom of the central hub area, and an annular seat formed in a transition area at the top of the annular wall; and
   a wheel cover having a substantially uniform thickness including a center portion which is bent to be complementarily shaped to the central hub area of the wheel without appending on structures so as to overlap and extend beyond the protrusion formed in the annular wall of the wheel and extend into the curved portion of the annular wall to the bottom of the central hub area and lie against the annular seat.

2. A wheel assembly according to claim 1, wherein the protrusion formed in the annular wall of the wheel is a stepped protrusion.

3. wheel assembly according to claim 1, wherein the inner portion of the wheel cover is deflected by the bottom of the central hub area so as to bias the wheel cover against the protrusion formed in the annular wall of the wheel.

4. A wheel assembly according to claim 1, wherein the curved portion of the annular wall which extends from the protrusion to a bottom of the central hub area defines a recess.

5. A wheel assembly according to claim 1, wherein an adhesive is provided between the outboard surface of the wheel and an inboard surface of the wheel cover.

6. A wheel assembly according to claim 1, wherein the wheel cover is made from a metal.

7. A wheel assembly according to claim 1, wherein the wheel includes an outboard rim along an outer peripheral portion thereon and the wheel cover includes an outer peripheral portion that terminates radially within the outboard rim of the wheel.

8. A wheel assembly according to claim 1, wherein the wheel includes a recess formed along an outer peripheral edge of the outboard surface thereof and the wheel cover includes a lip on an outer peripheral portion thereof which lip is configured to be received in the recess formed along an outer peripheral edge of the outboard surface of the wheel.

9. A wheel assembly according to claim 1, further including a cap which is configured to extend over the central hub area of the wheel with the wheel cover therebetween, the cap having an outer peripheral portion which is configured to be received in the annular seat formed in the transition area at the top of the annular wall with the wheel cover therebetween, the cap having a plurality of clasp elements which extend from an inboard surface of the cap and are configured to engage the protrusion formed in the annular wall of the wheel with the wheel cover therebetween.

10. A wheel assembly according to claim 1, wherein the central portion of the wheel cover which is complementarily formed to the central hub area of the wheel comprises at least one protrusion.

11. A wheel cover according to claim 10, wherein the central portion of the wheel cover which is complementarily formed to the central hub area of the wheel comprises a plurality of spaced apart protrusions.

12. A wheel cover for covering a wheel having a hub receiving area, and annular wall surrounding the hub receiving area, a protrusion formed in the annular wall, and an outboard peripheral edge, the wheel cover comprising:
    a wheel cover having an inner portion disposed adjacent the hub receiving area and an outer periphery disposed adjacent the outboard peripheral edge; and
    a hub lock for securing the cover to the hub receiving area of the wheel, the hub lock including an area of the inner portion of the cover which has a substantially uniform thickness and is bent to be complementarily shaped to be superposed over and extend beyond the protrusion formed in the annular wall of the wheel without appending structures, said hub lock comprising an area of the inner portion of the cover which is configured to be deflected by a bottom portion of the central hub area of the wheel so as to bias the wheel cover against the protrusion formed in the annular wall of the wheel.

13. A wheel cover according to claim 12, wherein the wheel includes an outboard rim and the wheel cover includes an outer peripheral portion that is configured to terminate radially within the outboard rim of the wheel.

14. A wheel cover according to claim 12, wherein the wheel includes a recess in the outboard peripheral edge, and the wheel cover includes a peripheral locking structure for securing the wheel cover to the wheel, the peripheral locking structure comprising a lip formed in an outer peripheral portion of the wheel cover that is configured to be received in the recess in the outboard peripheral edge of the wheel.

15. A wheel cover according to claim 12, wherein the wheel includes an annular seat formed in a transition area at the top of the annular wall and the wheel cover is configured to lie against the annular seat.

16. A wheel cover according to claim 12, wherein the wheel cover is formed from a metal.

17. A wheel cover according to claim 12, wherein the inner portion of the wheel cover which is complementarily formed to the central hub area of the wheel comprises at least one protrusion.

18. A wheel cover according to claim 17, wherein the inner portion of the wheel cover which is complementarily formed to the central hub area of the wheel comprises a plurality of spaced apart protrusions.

19. A wheel assembly comprising:
    wheel having a hub receiving area, and annular wall surrounding the hub receiving area, a protrusion formed in the annular wall, an annular seat formed in a transition area at the top of the annular wall, and an outboard peripheral edge;
    a wheel cover having an inner portion disposed adjacent the hub receiving area and an outer periphery disposed adjacent the outboard peripheral edge;
    a hub lock for securing the cover to the hub receiving area of the wheel, the hub lock including an area of the inner portion of the cover which has a substantially uniform thickness and is bent to be complementarily shaped to be superposed over and extend beyond the protrusion formed in the annular wall of the wheel without appending structures, said hub lock comprising an area of the inner portion of the cover which is configured to be deflected by a bottom portion of the central hub area of the wheel so as to bias the wheel cover against the protrusion formed in the annular wall of the wheel; and
    a cap which is configured to extend over the central hub area of the wheel with the wheel cover therebetween.

20. A wheel assembly according to claim 19, wherein the protrusion formed in the annular wall of the wheel is a stepped protrusion.

21. A wheel assembly according to claim 19, wherein the cap has a plurality of clasp elements which extend from an inboard surface of the cap which clasp elements are configured to engage the protrusion formed in the annular wall of the wheel with the wheel cover therebetween.

22. A wheel assembly according to claim 19, further comprising a peripheral locking structure which comprises a recess formed in the outboard peripheral edge of the wheel and a lip formed on an outer peripheral portion of the wheel cover that is configured to be received in the recess in the outboard peripheral edge of the wheel.

23. A wheel assembly according to claim 19, wherein the cap has an outer peripheral portion which is configured to lie within the annular seat of the wheel.

24. A wheel assembly according to claim 19, wherein the inner portion of the wheel cover which is complementarily formed to the central hub area of the wheel comprises at least one protrusion.

25. A wheel cover according to claim 24, wherein the inner portion of the wheel cover which is complementarily formed to the central hub area of the wheel comprises a plurality of spaced apart protrusions.

* * * * *